Patented Sept. 5, 1944

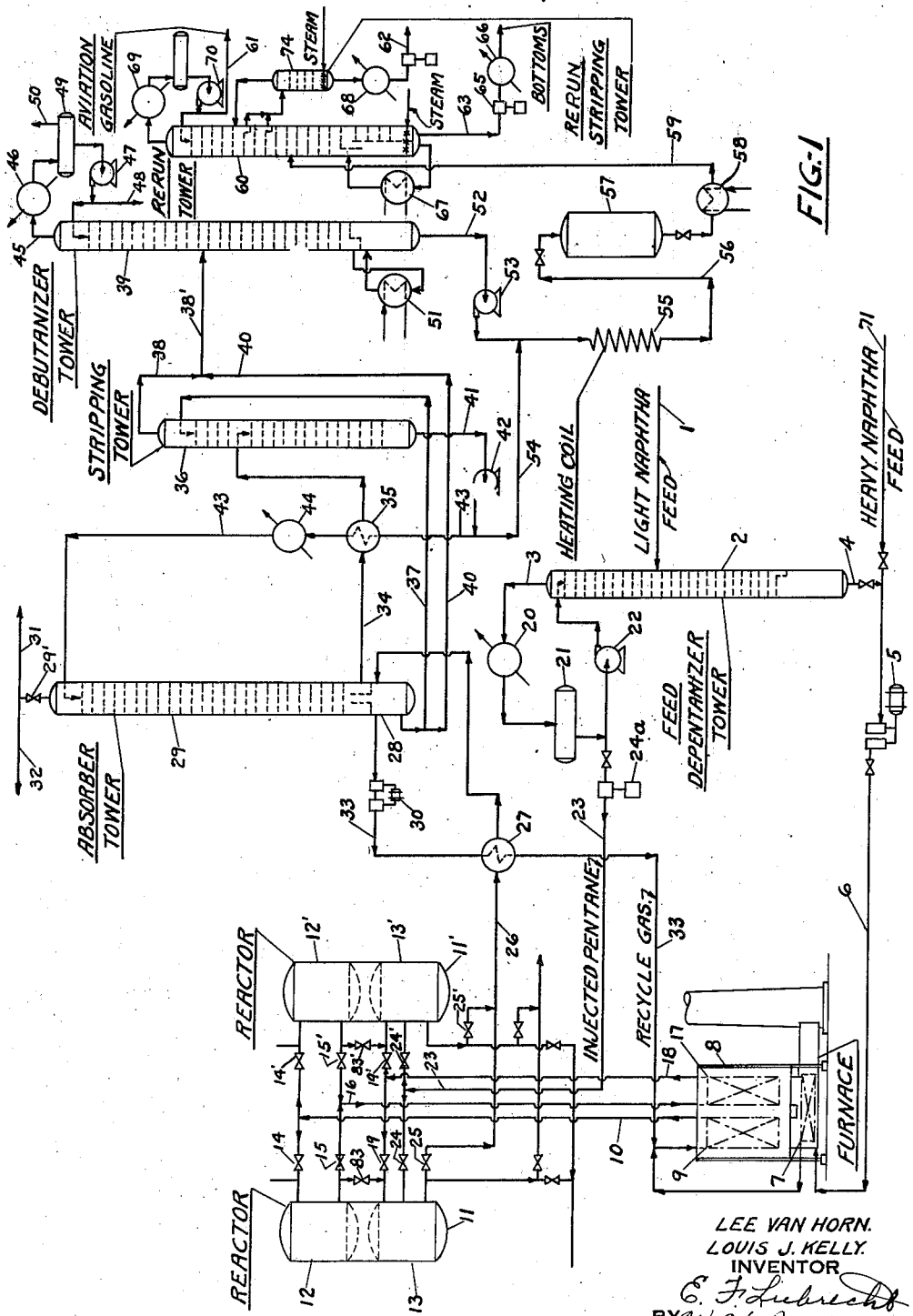

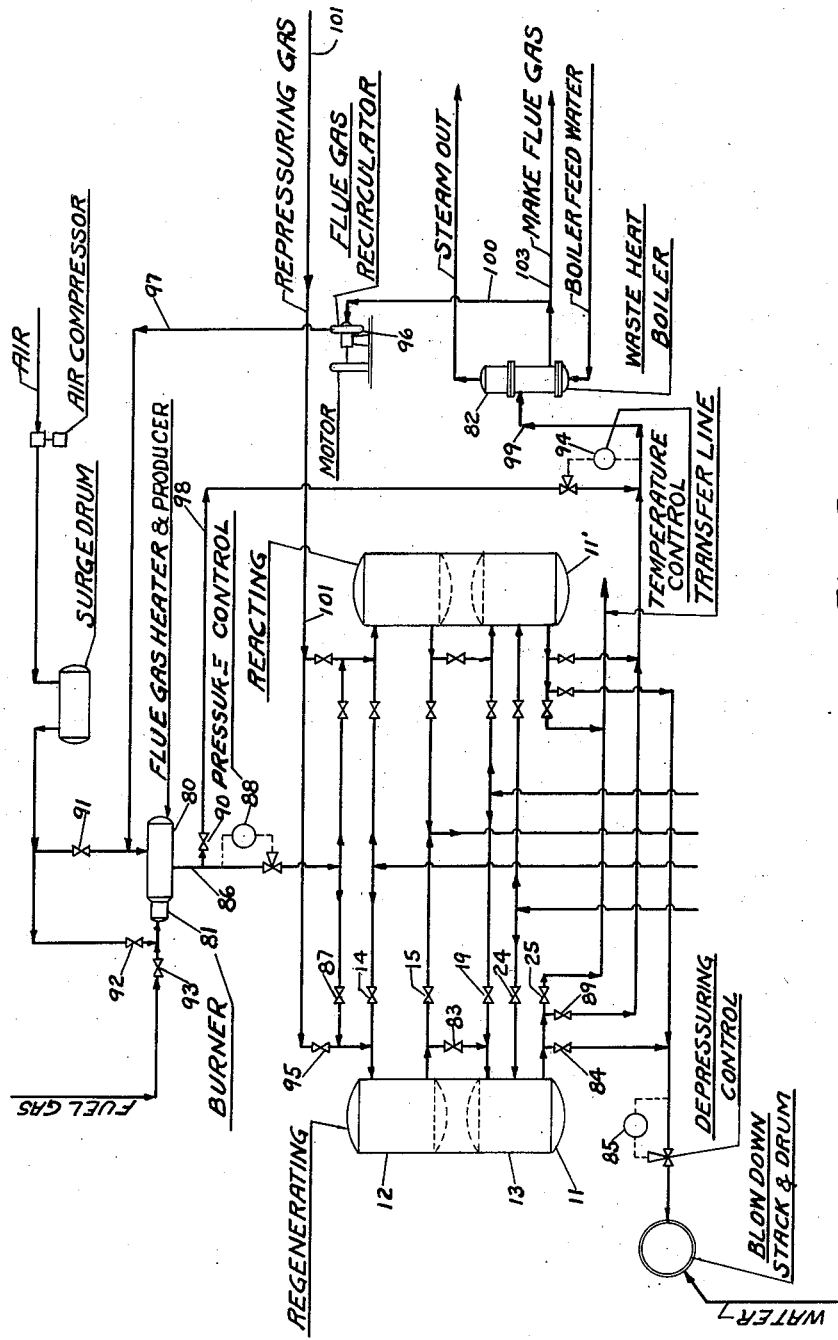

2,357,332

UNITED STATES PATENT OFFICE 2,357,332

CATALYTIC HYDROCARBON CONVERSIONS

Louis J. Kelly, Teaneck, and Lee Van Horn, Westfield, N. J., assignors to The M. W. Kellogg Company, Jersey City, N. J., a corporation of Delaware Application March 30, 1940, Serial No. 326,854

9 Claims. (Cl. 196—52)

This invention relates to catalytic hydrocarbon conversion processes such as reforming, aromatization, dehydrogenation, hydrogenation, isomerization, alkylation, desulfurization, polymerization, cracking, etc., and it relates more particularly to a catalytic reforming process and to low pressure purging and high pressure regeneration of catalysts which are employed in hydrocarbon conversion processes operating at superatmospheric pressure. The invention is especially applicable to the practice of a reforming process such as described in the co-pending application of Layng et al. S. N. 294,784, now Patent No. 2,320,147, dated May 25, 1943, involving the catalytic reforming of naphtha by a procedure wherein hydrogen is added to the reaction zone which is maintained under superatmospheric pressure.

In hydrocarbon conversion processes employing solid catalysts the activity of the catalysts gradually falls off due to deposits of carbonaceous materials and it is therefore necessary from time to time to interrupt the flow of hydrocarbons through the catalyst material and to regenerate the catalyst by burning the carbonaceous deposits therefrom. In this burning step the temperature must be carefully controlled to prevent sintering of the catalyst or loss of catalyst activity. Valuable hydrocarbons should be recovered from the spent catalyst before the burning or oxidation step and the oxidizing gases should be entirely removed from the catalyst before it again goes on-stream. An object of our invention is to provide a practical and commercial method and means for effecting this regeneration and these purging steps.

A further object is to provide method and means for regenerating large volumes of catalyst in situ without the necessity of employing complicated and expensive heat exchangers in the catalyst bed proposed heretofore. Our object is to avoid the complicated, expensive and troublesome conduits, heat exchange coils, etc., which have heretofore been imbedded in the mass of catalyst material, to simply support a massive bed catalyst in a reaction chamber which contains practically nothing but catalyst material and to obtain with this simplified apparatus an even closer temperature control and more efficient regeneration than can be obtained with the complicated structures heretofore used.

A further object of the invention is to provide improved methods and means for purging the catalyst bed both before and after regeneration. A further object is to strip oil out of spent catalyst before regeneration without impairing the physical or chemical structure of the catalyst.

A further object of the invention is to provide a regeneration system wherein flue gas may be recirculated at a substantially constant rate regardless of the changing flue gas requirements of each catalyst bed as it consecutively is on-stream, purged, regenerated and purged. A further object is to provide an improved method and means for utilizing the heat of by-passed flue gas as well as regeneration gas.

A further object is to employ improved method and means for simultaneously regulating the temperature and oxygen concentration of gases employed for regeneration and purging. A further object is to provide an improved method and means for introducing oxygen into regeneration gases along with recycled gases.

The problem of catalyst regeneration is one of long standing and is perhaps the most serious problem which confronts a refinery adopting a catalytic conversion process. All simple solutions heretofore proposed have been inoperative for commercial use and the enormous expense of the more complicated regeneration processes has been one of the chief deterrents with regard to commercial adoption of catalytic conversion processes. The primary object of our invention is to provide a simple and inexpensive system for purging and regenerating spent catalyst material which will be even more efficient than systems heretofore employed, and which will at the same time maintain high catalyst activity and prolong catalyst life. A further object is to provide a regeneration system wherein utility and operating costs as well as investment costs are reduced to a minimum. Other objects will be apparent as the detailed description of the invention proceeds.

While many features of our invention are applicable to a wide variety of catalytic conversion processes, the invention is particularly useful in processes of catalytic reforming or aromatization, such as described in the application previously mentioned, wherein hydrocarbon vapors are contacted with catalysts in the presence of hydrogen at a pressure of 200 to 400 pounds per square inch. The preferred catalyst of such a process is a group VI oxide such as molybdenum oxide supported on Activated Alumina. This catalyst may be on-stream for about six hours and it is therefore desirable that the complete purging and regeneration be effected in a like time in order that one catalyst chamber may be fully prepared for again going on-stream before the catalyst in the other chamber becomes deactivated.

We have found that for effective purging the catalyst chamber should be reduced to about atmospheric pressure and that this depressuring step preferably should be at a controlled rate since instantaneous pressure release may result in considerable catalyst degradation.

After depressuring, the catalyst is purged at a low pressure with hot flue gas which effectively strips all vaporizable hydrocarbons out of the spent catalyst. The catalyst chambers are preferably repressured with hot flue gas immediately after this low pressure purging step and prior to the introduction of oxygen so that the actual regeneration step may be effected at elevated pressures suitably from 50 to 150, and preferably about 100 pounds per square inch. At such pressure the ignition temperature of carbonaceous material is low enough so that the maximum regeneration temperature can easily be held within safe limits. However, the regeneration may be effected at pressures ranging from atmospheric to 400 pounds or higher.

After the catalyst chambers are brought up to the desired pressure, regeneration of the catalyst is started by introducing oxygen-containing flue gas. The oxygen reacts with the coke or carbonaceous deposit forming carbon dioxide. The burning apparently occurs in a relatively narrow band, which starts at the point of flue gas entrance and moves down through the catalyst bed that is in the direction of gas flow. The heat thus liberated is absorbed as sensible heat in the flue gas which is heated from its inlet temperature, suitably about 550° F. to 650° F. to its discharge temperature, preferably maintained below about 1150° F. to 1200° F. by controlling the oxygen content of the flue gas. Hot flue gas leaving the reactor is cooled, preferably in a waste heat steam boiler, and the heat thus removed utilized for the generation of steam. A large proportion of the flue gas discharged from the reactor is recirculated, the remainder or "make" flue gas being discharged from the system.

Near the end of the regeneration step the oxygen content of the flue gases in the catalyst chamber may be appreciable and the temperature in the catalyst bed may have fallen to about the inlet temperature of the flue gas that is about 675° F. At this time the temperature of the recycled flue gas is gradually increased by combustion of fuel gas in the flue gas heater so that the catalyst bed is preheated or brought back to a temperature suitable for the conversion reaction of about 975° F. During or after this reheating step, the flue gases may be charged to the catalyst zone incompletely burned so as to provide a reducing atmosphere for removing oxygen from said catalyst zone before hydrogen and hydrocarbons are once more charged thereto.

In order to strip the regeneration gases from the system and to insure the removal of all oxygen-containing gases we again depressure the chamber to about atmospheric pressure, discontinue the introduction of flue gas, purge for a few minutes with recycle gas (which contains hydrogen) and finally pressure with recycle gas so that the catalyst chamber is once more ready to go onstream at the desired high temperature and pressure.

The invention will be more clearly understood from the following detailed description read in connection with the accompanying drawings which form a part of this specification and which schematically illustrate a flow diagram of our improved reaction and regeneration system.

While the invention is applicable to a wide variety of catalytic conversion processes it will be described in connection with a catalytic reforming process for converting a light virgin naphtha into high octane aviation gasoline, and also with respect to a procedure for converting low octane number heavy virgin naphtha into high octane number motor fuel.

The catalyst employed in this process is preferably molybdenum oxide supported on Activated Alumina. It should be clearly understood, however, that the invention is applicable to the wide variety of catalytic processes hereinabove enumerated. For catalytic cracking the charging stock may be gas oils or heavier products and the catalyst may be activated natural clays such as acid-treated bentonite (Super Filtrol), metal oxides admixed with or deposited on activated silica, silica gel, etc.; oxides of metals such as aluminum, magnesium, copper, nickel, cerium, thorium, manganese, etc., may be co-precipitated with silica gel, ball-milled therewith or deposited thereon by impregnation or adsorption and the catalyst may be in any suitable granular or pelleted form. For dehydrogenation, reforming, aromatization, etc., we prefer to employ Activated Alumina as the catalyst support and to support thereon oxides of VI group metals and/or oxides of certain other metals such as thorium, cerium, vanadium, etc. For polymerization the catalyst may comprise phosphoric acid on kieselguhr or copper pyro-phosphate, etc., on any suitable support. No novelty per se is claimed in any particular catalyst and the catalysts require no further description. Those skilled in the art are familiar with the temperatures at which various catalysts should be regenerated and the following description of a preferred embodiment of our invention will be sufficient to teach those skilled in the art how to employ the invention in connection with other processes and other catalysts.

When the object of the process is the production of a maximum amount of aviation gasoline, the charge stock is preferably a light virgin naphtha, for example one having an A. S. T. M. end point of 340° F.

A typical inspection of this naphtha and of the aviation gasoline produced therefrom is as follows:

|  | Feed stock | Aviation gasoline |
|---|---|---|
| A. P. I. gravity | 66.3 | 51 |
| Molecular weight | 101 | 99 |
| Reid vapor pressure | 10 | 3 |
| 50% distillation point °F | 220 | 222 |
| End point °F | 340 | 340 |
| Octane number CFR-M | 63.5 | 76 |

In addition to aviation gasoline other liquid products normally produced are a small quantity of a heavy liquid polymer amounting to about 1% to 2% of the charge and about the same amount of a gasoline fraction suitable for ordinary motor fuel boiling above the end point of the aviation gasoline, i. e., 340° F. and below 400° F. Coke is produced on the catalyst to the extent of about 1% of the charge and the other products are normally gaseous hydrocarbons and hydrogen.

The following are given as illustrative of typical and suitable operating conditions for the reforming operation:

Feed rate—unit volume of naphtha (liquid basis) passed over unit volume of catalyst per hour _____ 0.5
Ratio of recycle gas to feed____cu. ft./bbl__ 2,500
Pressure in reactor____lbs./sq. in. gauge__ 250
Length of conversion period_____hours__ 6
Average reaction temperature_____°F__ 950

The flow through the unit, as illustrated in Figure I of the drawing will now be described in connection with the conversion of a light virgin naphtha to a high octane aviation gasoline. In this type of conversion, it has been found advantageous to depentanize the feed stock prior to passage through the catalytic reactors. The light naphtha is preheated to a suitable temperature for the depentanizing step, for example about 275° F. and then passed through line 1 to the feed depentanizer tower 2. A butane-pentane fraction containing a relatively small amount of lighter hydrocarbons is taken overhead from tower 2 through line 3, and the depentanized feed as a bottom product through line 4 and charged by pump 5 through line 6 into heating coil 7 in furnace 8. After leaving coil 7 the feed is combined with recycle gas including a large proportion of hydrogen introduced through line 33 and passed into a second heating coil 9 wherein heating of the mixture to a suitable conversion temperature is completed, for example a temperature of about 1025° F. The heated mixture is then charged to the catalytic conversion system through line 10.

This system comprises a pair of duplicate reactors 11 and 11' arranged in parallel relationship, and interconnected so that one reactor is undergoing regeneration while the other is onstream. Each reactor comprises an upper chamber 12, 12' and a lower chamber 13, 13' filled with catalyst.

Assuming reactor 11' is on-stream, the charge is introduced thereto by opening valve 14' and passing the heated feed stock through upper chamber 12' wherein its temperature is decreased by reason of the endothermic action involved, for example the exit temperature of the vapors from chamber 12' may be about 980° F.

The reaction product vapors are withdrawn from the bottom of chamber 12' through opened valve 15' (by-pass valve 83' being closed) and passed through line 16 to heating coil 17 in the furnace wherein they are reheated to a suitable conversion temperature and then passed by line 18 through open valve 19' to the upper portion of lower chamber 13'.

The butane-pentane fraction passing through line 3 is condensed in condenser 20 and collected in drum 21, a portion being returned as reflux to tower 2 by pump 22, and the remainder being preferably charged to the catalytic conversion zone, or alternatively to the debutanizer tower 39. In various instances the latter practice is regarded as preferable since the degree of improvement effected by passing the pentane fraction through the converter is questionable and, in general, the passage of this fraction through only a part of the catalyst as illustrated is preferred. This fraction is charged to the conversion system through line 23 by pump 24a, and through opened valve 24' into an intermediate point in chamber 13'.

The reaction products are withdrawn from the lower portion of chamber 13' through open valve 25' and passed through transfer line 26 and an intervening heat exchanger 27, and additional exchangers if required, wherein the reaction products are cooled to a temperature suitable for separation of its hydrogen content, and then into a gas separator 28 at the base of absorber tower 29. The operating pressure on the reactors is preferably maintained within the range of about 30 lbs. to 400 lbs., for example about 250 lbs. gauge by pressure control valve 29'. Separator 28 is maintained at a pressure and temperature suitable for separating the hydrogen content of the reaction products. A part of the separated gas which is rich in hydrogen is recycled directly to the furnace preheater coil 9 by means of compressor 30 through line 33. The balance of the separated gas flows upwardly through the absorbing tower 29 wherein its butane and pentane content are recovered. The gases withdrawn from the top of the absorber 29 may be passed to the refinery gas main through line 31 and/or passed through line 32 for utilization in the regeneration stage of the cycle as hereinafter described. Enriched absorbing oil is withdrawn from the bottom of absorber 29 through line 34 and passed through heat exchanger 35 where it is preheated with heat taken from the hot lean oil and introduced into stripping tower 36 where the adsorbed components are removed.

The adsorbed components in the rich oil are taken overhead from the stripper through line 38 and the heavy constituents refluxed back by means of liquid withdrawn from the gas separator 28 through line 37, the liquid withdrawn from separator 28 being split between lines 37 and 40. The overhead vapor enters debutanizer tower 39 through lines 38 and 38' and is combined with liquid from separator 29 introduced through line 40. This overhead vapor normally will contain methane, ethane, propane, butane and pentane. The lean oil bottoms from stripper tower 36 are withdrawn through line 41, part thereof being pumped by pump 42 through line 43 back to absorber tower 29 and the remainder forwarded through line 54 and combined with the debutanized product withdrawn from tower 39 through line 52. Lean oil passing through line 43 after exchanging on rich oil in heat exchanger 35 is cooled in condenser 44 with water and then passes to the top of absorber tower 29.

The bottoms from gas separator 28 flow under their own pressure through line 40 to the debutanizer tower 39.

The overhead from tower 39 passes through line 45 and is condensed in water cooler 46. The heavier components are condensed and returned to the top of the tower as reflux by pump 47 and the net liquid is discharged through line 48 to the refinery gas plant where butane and pentane may be fractionated out if desired. The uncondensed gas, largely propane and lighter hydrocarbons, is withdrawn from the top of the reflux drum 49 through line 50 to the refinery gas system. The bottoms from the debutanizer tower after being reboiled in exchanger 51 are charged to the clay treating and/or rerun tower.

In case clay treatment is employed, the debutanizer bottoms are passed through line 52 by pump 53, combined with the oil in line 54 and passed through heating coil 55 wherein the liquid is completely vaporized. The vapors are passed through line 56 to a clay treating tower 57 at a suitable pressure and temperature, for example about 100 lbs. and 500° F. The vapors withdrawn from clay tower 57 pass through exchanger 58.

The treated materials then pass by line 59 to a rerun fractionating tower 60 wherein aviation gasoline is taken overhead through line 61, heavy motor gasoline as a side stream through line 62 and polymers as bottoms through line 63. The necessary reboil heat is furnished by reboiler 67. The polymer bottoms and the heavy motor gasoline fraction taken through the side stream stripper 74 are both stripped with steam as indicated.

Aviation gasoline is condensed in condenser 69 and a portion of this condensate is refluxed to control the quality of the overhead and the product sent to storage through line 61 by pump 70.

The side stripper 74 is used to draw off that portion of the feed to the rerun tower which boils between end point of the aviation gasoline and 400° F. This product is suitable for blending directly into motor gasoline without further treatment. The amount of this product when operating with a light naphtha charge is quite small, somewhere between about 1% to 2% of the feed.

When operating on a heavy naphtha feed, for example a heavy east Texas naphtha having a gravity of 51° A. P. I., and distilling between 250° F. and 430° F., the depentanizing step may be omitted, the charge being introduced through line 71, the flow being otherwise similar to that described for the conversion of light naphtha. In this case a relatively small amount of aviation gasoline may be produced, the principal product being motor gasoline withdrawn through the side stream stripper 74 as a heavy 400° F. end point material.

While reactor 11' is on-stream, reactor 11 is undergoing regeneration. The regeneration stage of the cycle and equipment used therein is shown diagrammatically in Fig. II. At the starting point of the regeneration stage of the cycle, reactor 11 is just ready for regeneration and is operating on the conversion stage of the cycle together with reactor 11', the oil vapors flowing through both reactors in parallel. At this point oil vapor inlet and outlet valves to reactor 11 are open and all other valves in lines leading thereto are closed. During this time flue gas is being recirculated between fuel gas heater 80 and waste heat boiler 82, completely by-passing both reactors, and is heated in flue gas heater 80 by combustion of fuel gas and air in burner 81. The recirculating gas is forced by compressor 96 through a circuit including lines 97, 86, 98, 99 and 100 and is cooled in the waste heat boiler 82, in which steam is generated. The pressure and quantity of the circulated gas preferably are maintained substantially constant at all times at a pressure between the range of 50 to 150 pounds, suitably about 100 pounds gauge.

To start regeneration of spent catalyst in reactor 11, all oil vapor inlet valves and outlet valves 14, 15, 19, 24 and 25 and also valves 87, 89 and 95 are closed. Valve 83 is then opened, thereby connecting the two chambers 12 and 13 in series. Valve 84 to the blowdown stack is opened. The oil vapors, present in the chambers under high pressure, are then permitted to flow slowly through into the blowdown stack in a period of about five minutes. The depressuring rate is controlled by depressuring control 85 in order to prevent damage to the catalyst and supporting structure.

The next operation is to purge residual oil vapors from the chambers to the blowdown stack, which is accomplished by bleeding excess flue gas from the recirculating system flue gas line 86 into the reactor through valve 87, the rate being adjusted by pressure control means 88 to maintain pressure in the recirculating system. This operation is continued until substantially complete removal of oil vapors is effected, for example until a ten-volume purge has been carried out, at which time valve 84 is closed.

The reactor is now repressured with flue gas to the pressure maintained in the flue gas circulating system, suitably about 100 pounds, by admitting flue gas to the chambers through valve 87 by suitable adjustment of pressure control means 88. During this time the chamber inter-connecting valve 83 is open. When the pressure in the chambers has reached the pressure of the recirculating system, the outlet valve 89 from the chamber is opened and the flue gas by-pass valve 90 is closed and valve 91 admitting coke combustion air to the flue gas heater is opened. Air admitted through line 91 is proportioned so that combustion will not occur at a rate sufficient to heat the catalyst to an excessively high temperature. Immediately thereafter, valves 92 and 93 are closed, thereby cutting the supply of fuel gas and air for its combustion from flue gas burner 81. At this period flue gas heater 80 is merely a mixer for the coke combustion air and recycled flue gas. A flue gas and air mixture at a temperature of 650° F. is now flowing through reactor 11 causing combustion of coke therein, the heat in the circulated combustion gas at a temperature level over about 650° F. being removed in the waste heat boiler 82. Excess or make flue gas is discharged through line 103. This operation is continued until substantially all the coke in reactor 11 is consumed which is indicated by oxygen appearing in the outlet gas from the reactor. At this point the catalyst will have been cooled by the flue gas to a temperature approximating the temperature of the flue gas, that is about 675° F.

The next step is to reheat the catalyst beds in the two chambers to a temperature, approximating the conversion temperature. Heat is supplied to the flue gas by opening flue gas heater burner valves 92 and 93, and immediately thereafter coke combustion air valve 91 is closed. The reheating is carried out with series flow through the chambers, valve 83 remaining open. The flue gas temperature of the gas passing through line 86 at this time is suitably maintained at about 1150° F. and a constant temperature of flue gas to the waste heat boiler is maintained by opening flue gas by-pass valve 90, the flow through the by-pass being controlled by a temperature controller 94. This reheating operation is continued until sufficient heat has been imparted to the catalyst beds to raise the average temperature to the desired reaction temperature that is about 1000° F. Make flue gas produced during this operation is discharged through line 103. Shortly before the end of the reheating period the temperature of the flue gas may be lowered somewhat, for example to about 1050° F., thereby securing an even distribution of heat throughout the beds. The next step is to drop the flue gas pressure in the chambers, which is accomplished by closing valves 87 and 89 and opening valve 84, and slowly bleeding flue gas to the blowdown stack by suitable adjustment of depressure control means 85. When the flue gas pressure is down, valve 84 is closed and the next step is to repressure the chambers to the desired reaction pressure, for example a pressure of about 275 pounds. This is done by opening valve 95 admitting a repressuring gas through line 101, rate of repressuring being controlled by a flow controller not shown. The repressuring gas preferably consists of tail gas withdrawn from the absorber tower 29 through line 32 or, alternately gas containing a large proportion of hydrogen from the recycle compressor discharge line 33.

When the pressure on the chambers reaches the reaction pressure, the flow of gas is stopped by closing valve 95. Inter-connecting valve 83 is then closed and the chambers are ready to be placed in reacting service in parallel with reactor 11'. This is done by opening oil vapor inlet and outlet valves 14, 15, 19, 24 and 25, thus completing the regeneration stage of the cycle.

It is to be understood that the valve operations and their proper sequence described in the foregoing will in practice preferably and usually be effected by automatic means well known in the art and which accordingly are not described herein.

Further energy may be recovered from the regeneration gases in addition to that recovered as steam by passing the make flue gas by line 103 to an expansion turbine.

In order to fully disclose to those skilled in the art what is now regarded as the best mode of practicing the invention, the foregoing example has been given in considerable detail with respect to suitable or illustrative conditions, such as charging stock, reaction periods, temperatures and the like. It will be apparent that such details are exemplary only, and it is not intended that any novel features of the process be restricted other than is required by the claims appended hereto.

We claim:

1. The method of regenerating a bed of spent catalyst material in a catalytic hydrocarbon conversion process operating at superatmospheric pressure and a temperature of about 850° to 1050° F., which method comprises slowly releasing the pressure on the spent catalyst material to avoid impairing the catalyst structure, stripping oil from the spent catalyst by means of hot oxygen-free flue gas under said reduced pressure, increasing the flue gas pressure on the spent catalyst to about 50 to 400 pounds per square inch, recycling flue gas from the spent catalyst through a cooling zone and back to the spent catalyst, introducing oxygen into the cooled recycled flue gas in sufficient amounts and for a sufficient period to effect combustion of carbonaceous material on the spent catalyst to the required extent without exceeding a catalyst temperature of about 1150° F. at any substantial portion of said bed and said bed is largely cooled to a temperature substantially below about 950 to 1000° F., increasing the temperature of the recycled flue gas thereafter for reheating the cooled catalyst bed to a temperature of about 950° to 1000° F., again reducing the pressure on the catalyst and purging the catalyst of regeneration gases by means of a gas containing free hydrogen, and increasing the hydrogen pressure on the catalyst to the desired super-atmospheric pressure for on-stream reaction immediately prior to the on-stream reaction.

2. In a catalyst conversion system which is provided with a plurality of reactors which are alternately on-stream and undergoing regeneration and which is provided with a hot flue gas heater and producer for regulating the temperature of regeneration gases, and a means for absorbing heat from regeneration gases, the method of continuously recycling flue gas from said flue gas heater and producer through said heat absorbing means and then back to said gas heater and producer which comprises passing flue gas from said flue gas heater and producer through a reactor undergoing regeneration and thence through said heat absorbing means and back to the flue gas heater and producer while a reactor is undergoing regeneration, by-passing flue gas directly from said heater and producer to said heat absorbing means and then back to said flue gas heater and producer when said flue gas is not required for a reactor undergoing regeneration and withdrawing make flue gas from the system.

3. In a catalyst conversion system which is provided with a plurality of reactors which are alternately on-stream and undergoing regeneration and which is provided with a flue gas heater and producer for regulating the temperature of regeneration gases and a waste heat boiler for absorbing heat from regeneration gases, the method of continuously recycling flue gas from said flue gas heater and producer through said waste heat boiler and then back to said heater and producer, which comprises passing flue gas from said flue gas heater and producer through a reactor undergoing regeneration and thence through said waste heat boiler and back to the flue gas heater and producer while a reactor is undergoing regeneration, and by-passing flue gas directly from said heater and producer to said waste heat boiler and then back to said heater when said flue gas is not required for a reactor undergoing regeneration and withdrawing make flue gas from the system.

4. A regeneration system for burning carbonaceous material from spent catalyst which comprises a flue gas heater, a plurality of catalyst chambers, a fractionation system for separating at least a gasoline fraction and a stabilizer gas fraction, means for conveying the stabilizer gas fraction to said flue gas heater, means for introducing air into said flue gas heater, means for selectively introducing flue gases from said flue gas heater to said catalyst chambers, a waste heat boiler, means for removing gases from said reaction chamber, passing said removed gases to said waste heat boiler and recycling the major portion of said gases to said flue gas heater and means for maintaining said flue gas heater under a pressure of about 50 to 150 pounds per square inch.

5. The system defined by claim 4 which includes means for by-passing gases from said flue gas heater directly to said waste heat boiler.

6. The method of purging and regenerating spent catalyst material in a catalytic hydrocarbon conversion process operating at superatmospheric pressure and a temperature of about 850 to 1050° F., which method comprises slowly releasing the pressure on the spent catalyst material to avoid impairing the catalyst structure, stripping oil from the spent catalyst by means of hot substantially oxygen-free gas, increasing the pressure on the spent catalyst to about 100 to 150 pounds per square inch, regenerating the catalyst at said pressure by means of flue gas containing oxygen introduced at such temperatures and with such oxygen concentrations that the temperature of the catalyst does not exceed about 1150° F. and finally falls to below 950° F., reheating the regenerated catalyst to a temperature of about 950 to 1000° F., again reducing the pressure on the catalyst and purging the catalyst of regeneration gases by passing a reducing gas therethrough, and increasing the pressure on the catalyst to the desired superatmospheric pressure for on-stream reaction by means of gas rich in hydrogen.

7. The method of regenerating a bed of spent catalyst material which has become contaminated with carbonaceous matter, which method comprises stripping oil from the contaminated catalyst by means of hot oxygen-free flue gas at substantially atmospheric pressure, increasing the flue gas pressure on the contaminated catalyst to about 50 to 150 pounds per square inch, recycling flue gas from the spent catalyst through a cooling zone and then back to the spent catalyst, introducing oxygen into the cooled recycled flue gas in sufficient amounts and for a sufficient period to effect combustion of carbonaceous material on the contaminated catalyst to the required extent without exceeding the catalyst temperature of about 1150° F. whereby the burning of the carbonaceous deposit is confined to a zone relatively short with respect to the total length of the bed which zone moves progressively through the bed in the direction of gas flow, and the bed of catalyst is cooled to a temperature approximating that of the cooled recycled flue gas, increasing the temperature of the recycled flue gas in a heating zone at the end of the combustion step for reheating the catalyst to a temperature of about 950° to 1000° F., and purging the reheated catalyst with a reducing gas.

8. A process as defined in claim 7 further characterized in that said reducing gas comprises free hydrogen under a pressure of about 200 to 400 lbs. per square inch.

9. A cyclic process for the catalytic reforming of a naphtha hydrocarbon fraction which comprises the steps of, providing a bed of a reforming catalyst of substantial depth in the direction of flow of the reactants and preheated to a temperature within the range of about 850 to 1050° F., passing a vapor stream of said naphtha fraction preheated to a temperature within the same approximate range as said catalyst bed in contact therewith at a space velocity adapted to effect the desired reforming conversion whereby endothermic heat of conversion is supplied by both the preheat of the catalyst bed and vapors, thereafter during a succeeding regeneration period removing deactivating carbonaceous deposits from the catalyst, by circulating flue gas through a continuous circuit including the catalyst bed and an extraneous cooling zone, introducing oxygen-containing gas in controlled amounts into said circulating flue gas to remove the deposits by combustion and withdrawing make-flue gas therefrom, cooling the circulated flue gas in its passage through the cooling zone to a temperature substantially below the temperature required for said hydrocarbon conversion and withdrawing it from the catalyst bed at a temperature approximating the maximum safe regeneration temperature whereby the burning of the carbonaceous deposit is confined to a zone relatively short with respect to the total length of the bed which zone moves progressively through the bed in the direction of gas flow, heat of regeneration is largely removed as sensible heat with the effluent regeneration gases and the catalyst bed is largely cooled during said regeneration period to a temperature substantially below that required for conversion, and thereafter preheating the bed of regenerated and cooled catalyst by passing an inert gas in contact therewith heated to a temperature adapted to provide the preheated catalyst bed called for by the first recited step, and continuously repeating said steps in a cyclic operation.

LOUIS J. KELLY.
LEE VAN HORN.